May 24, 1955 — L. L. SOLES — 2,709,014
LOADING, STORING AND UNLOADING DEVICE
Filed Sept. 11, 1950 — 4 Sheets-Sheet 1
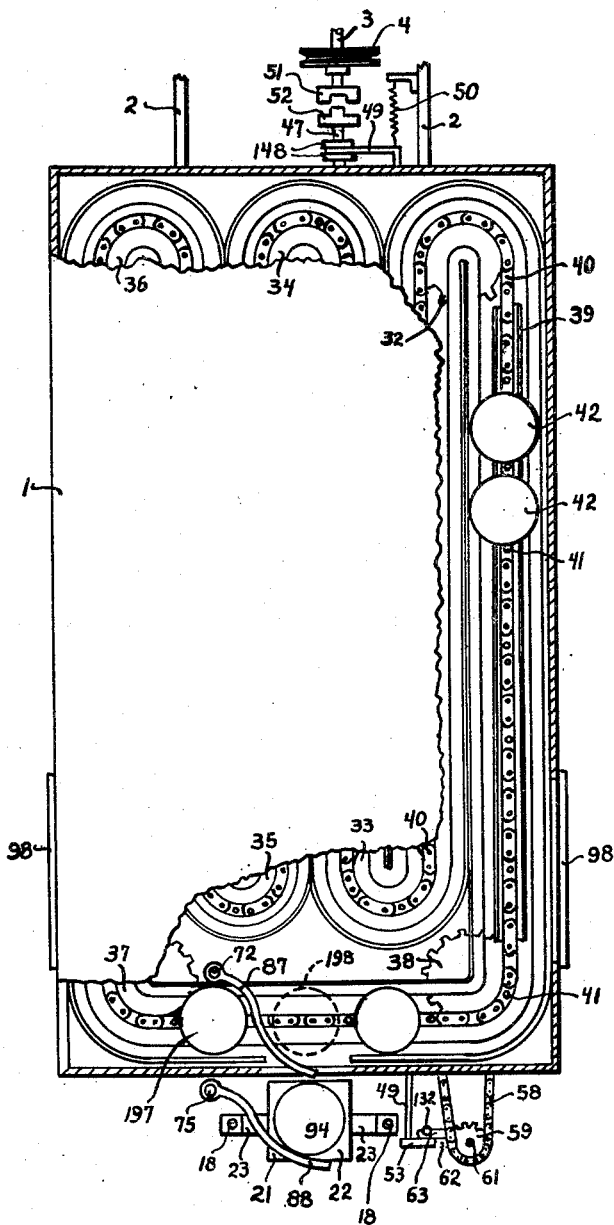
FIG.1
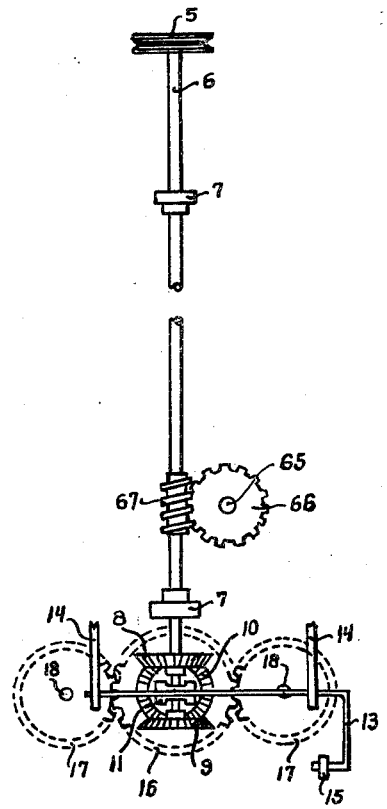
FIG.2
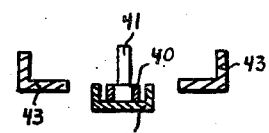
FIG.3
FIG.4
INVENTOR.
Leland L. Soles

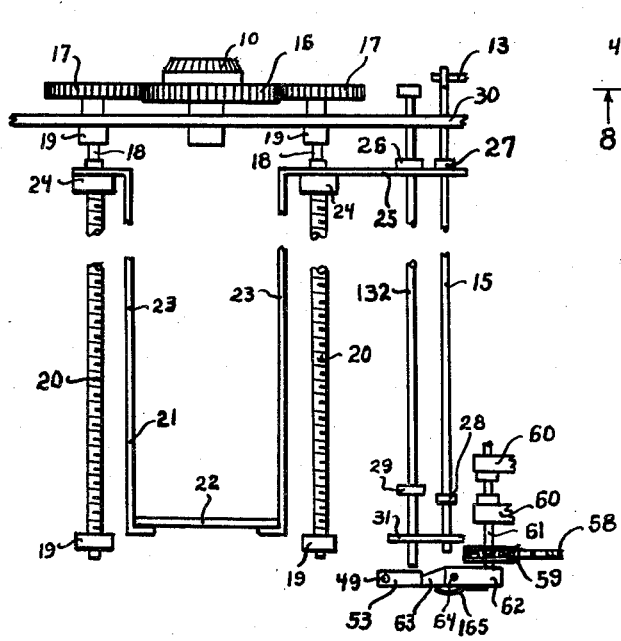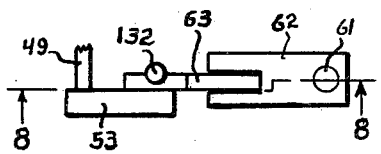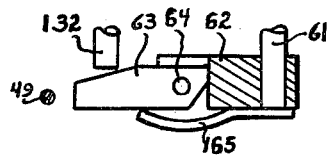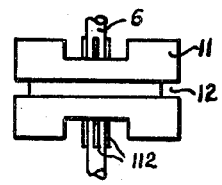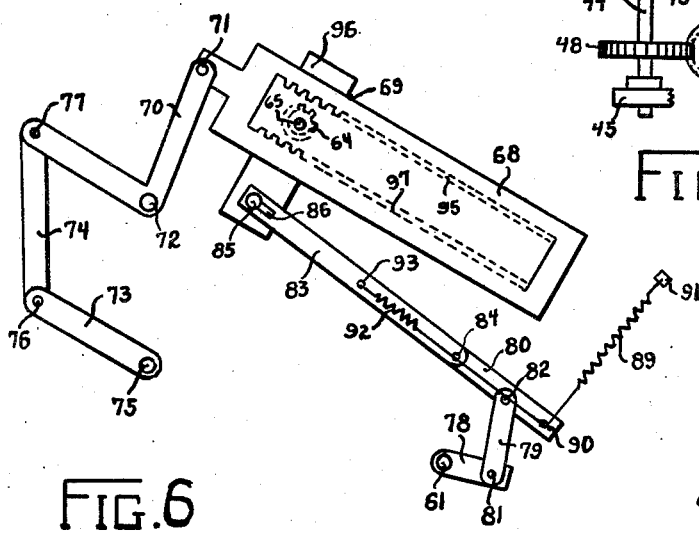

May 24, 1955 L. L. SOLES 2,709,014
LOADING, STORING AND UNLOADING DEVICE
Filed Sept. 11, 1950 4 Sheets-Sheet 3

INVENTOR.
Leland L Soles

LELAND L. SOLES
INVENTOR.

BY *Mary Ellen Soles*
ADMINISTRATRIX

United States Patent Office 2,709,014
Patented May 24, 1955

2,709,014

LOADING, STORING AND UNLOADING DEVICE

Leland L. Soles, Liberty Center, Ohio, assignor of one-half to Harold McCloy, Liberty Center, Ohio; Mary Ellen Soles, administratrix, c. t. a., of said Leland Soles, deceased Application September 11, 1950, Serial No. 184,245

13 Claims. (Cl. 214—518)

This invention relates to a loading, storing and unloading device. It may be used on trucks or warehouses where uniform items are loaded, stored and unloaded. It is adapted especially for milk trucks hauling milk cans from dairy farms.

In the present type of milk truck the driver has to lift the can with milk from the ground level to the level of the truck. The driver also has to climb into the truck to arrange the cans and unload the empty milk cans. Also at various intervals the empty milk cans and the filled cans have to be rearranged in order to make the empty cans accessible. My novel invention eliminates the lifting and the rearranging of the milk cans and hence eliminates climbing into the truck. In my novel invention the driver operates a bar or lever which automatically lowers the empty milk can from the truck. The driver then removes the empty can from the elevator, replaces it with the filled milk can, operates a bar or lever which automatically lifts the filled can to the level of the truck floor and then disposes the filled can on a conveyor. The novel device is then ready to discharge another empty can and repeat the cycle of operation described above. The filled cans are moved on a conveyor system within the truck so that substantially the entire floor space of the truck can be filled with filled milk cans. The same conveyor system also moves the empty cans so that every time a filled can is unloaded on the truck an empty can is ready to be discharged. When the truck is to be unloaded at a condensery or dairy the elevator system is disconnected and the conveyor is used to deliver the filled cans to the door on the side of the truck. The empty cans are then loaded on the conveyor system in the proper order so that the truck is ready for its next pick up trip at the dairy farms.

It will readily be noted that the truck driver does not have to lift the filled milk cans from the ground level to the floor level of the truck. Also he does not have to lift the cans about in the truck to properly arrange the cans. It also eliminates all climbing in and out of the truck while loading the truck. When the load of milk is unloaded at the condensery or dairy the filled cans do not have to be carried from various parts of the truck to the discharge door. Hence, much of the hard work in loading or unloading the truck is eliminated. Also less time is required to load and unload the truck.

A lever can be provided in the cab of the truck so that when the driver stops he operates this lever which causes the empty milk can to be lowered on the elevator. By the time the driver gets out of the cab and reaches the rear of the truck the empty can is ready to be taken from the elevator. After the empty can is taken from the elevator the filled milk can is placed on the elevator and the driver operates a lever which causes the filled milk can to be elevated and be placed on the conveyor system. By the time the driver reaches the cab this cycle of the loading operation is complete and the driver can proceed to his next stop.

It will readily be noted that my novel device could also be used for trucks hauling kegs of beer, barrels, cartons or cases. It can also be used in warehouses or storage places. It can also be used for loading heavy shells or projectiles on ammunition trucks and then unloading them at the gun as they are used.

One of the objects of my novel invention is to provide a device that will elevate articles from the ground level to the level of the truck or storage floor and dispose the article on a conveyor system.

Another object of my invention is to provide a conveyor system within the truck or storage space that will automatically arrange or move the items as the truck or storage space is loaded so that substantially the entire floor space can be utilized.

Another object of my invention is to adapt the same conveyor system so that items on the conveyor can be unloaded from a discharge door at the floor level of the truck or the items can be automatically discharged from the conveyor onto the elevator and then lowered to the ground level.

Another object of my invention is to provide an elevating system that can be controlled from the cab of a truck or other remote position.

Another object of my invention is to provide a device that eliminates the lifting in loading a truck or storage space.

Another object of my invention is to provide a device that places the items in proper sequence for unloading.

Other objects of my invention will be apparent from the following description of my improved device.

With these and other objects in view, my invention consists in the construction, combination and the arrangements of the various parts of my improved device as described in the specification, claimed in the claims, and illustrated in the accompanying drawings.

In the drawings:

Figure 1 is a partially sectioned view of a truck embodying my invention.

Figure 2 is an enlarged plan view of the mechanism used to operate the elevator of my improved device.

Figure 3 is a sectional view of the conveyor taken along line 3—3.

Figure 4 is a diagrammatic view of the clutch shift lever used in the elevator mechanism shown in Figure 2.

Figure 5 is an enlarged elevation of the elevator and the elevator operating mechanism.

Figure 6 is an enlarged plan view of the shifter operating mechanism.

Figure 7 is an enlarged top plan view of the conveyor control mechanism.

Figure 8 is a sectional view taken along line 8—8 of Figure 7.

Figure 9 is an enlarged view of the clutch member and the shifter slot.

Figure 10 is an enlarged view of the power transmission system to the conveyor system.

Figure 11:
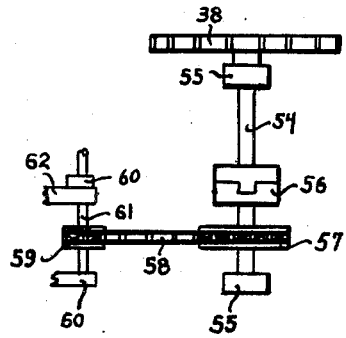
Figure 11 is an enlarged view of the clutch control system for the conveyor and the power transmission system therefor.

Referring to the drawings I have shown a closed truck body 1, partially cut away and mounted on the truck frame members 2. The shaft 3 is connected to the power take-off of the truck engine or any suitable source of power. The V-belt pulley 4 is keyed to the shaft 3. A V-belt, not shown, transmits power from the V-belt pulley 4 to the V-belt pulley 5 which is substantially directly above the V-belt pulley 4. The V-belt pulley 5 is keyed to the shaft 6 which is journaled in the bearings 7. The bevel gears 8 and 9 are journaled on the shaft 6 and mesh with the bevel gear 10. A clutch member 11, shown in Figures 2 and 8, slidably engages splines 112 on the shaft 6 and is provided with an annular shifter groove 12. The gear shift member, shown in Figures 2 and 4, is pivoted in the brackets 14 and engages the annular shifter groove 12. When the rod 15, which is pivoted to the gear shift member 13 at its upper end, is lifted the clutch member 11 engages the bevel gear 8; when the rod 15 is lowered the clutch member 11 engages the bevel gear 9; and when the rod 15 is in mid position the clutch member is in neutral position, that is it does not engage either of the bevel gears 8 or 9. The bevel gear 10 is keyed on the same shaft as the spur gear 16. The spur gear 16 meshes with the two spur gears 17 which are mounted on the shafts 18 which are journaled in the bearings 19. The shafts 18 are provided with threaded portions 20.

The elevator 21 comprises a platform 22 and hanger members 23 which are secured to the nut members 24 at their upper end. The nut members 24 engage the threads of the threaded portions 20 so that the elevator 21 is raised or lowered depending on the direction of rotation of the shafts 18. The elevator 21 is provided with an arm member 25 which engages the collars 26 and 27 when the elevator reaches it upper position and it engages the collars 28 and 29 when it reaches its lower position. The shafts 15 and 132 are mounted in 30 and 31.

An endless link chain 40 engages the sprockets 32, 33, 34, 35, 36, 37, and 38 as shown in Figure 1. The link chain 40 is supported by a channel member 39 between the sprockets. The link chain 40 is provided with pegs 41 which engage the milk cans 42 and move them as the link chain 40 moves. The milk cans 42 rest on the horizontal portion of the angle members 43 while the vertical portion of the angle members provide guide rails for the milk cans. Figure 3 is a sectional view showing the arrangement of the angle members 43, the link chain 40 and the link chain supporting channel 39.

The sprocket wheel 34 is keyed to a shaft 44 which is journaled in the bearings 45 as shown in Figure 10. A gear 48, keyed to the shaft 44 meshes with the worm gear 46. The worm gear 46 is keyed to the shaft 47. The shaft 47 is provided with a clutch member 52 which is adapted to engage the clutch member 51 on shaft 3 as shown in Figure 1. The clutch operating member 49, engages the collars 148 which are secured to the shaft 47. A shaft 49 extends to the rear of the truck and an arm member 53 is secured to the shaft 49 at its end.

The sprocket wheel 38 is keyed to the shaft 54 which in turn is journaled in the bearings 55 as shown in Figure 11. A clutch member 56 is provided in the shaft 54. A sprocket wheel 57 is keyed to the shaft 54. A sprocket wheel 59 is keyed to the shaft 61 which is journaled in the bearings 60. A link chain 58 engages the sprocket wheels 57 and 59. An arm member 62 is secured to the shaft 61. The arm member is provided with a slot in which the trip member 63 is pivotly secured on the pin 64, as shown in Figures 7 and 8. A spring member 165 secured to the arm member 62 tends to hold the trip member 63 in the position shown in Figure 8. When the trip member is in this position it engages the arm member 53 thus holding the clutch members 51 and 52 in a disengaged position.

Figure 12:
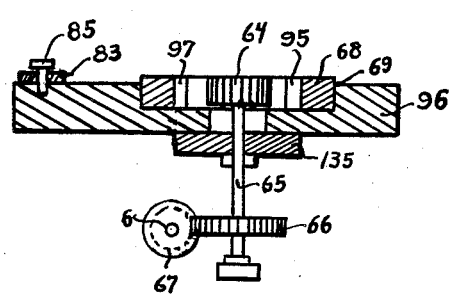
Figure 12 is an enlarged partially sectioned view of the power transmission system to the rack operating system.

Figure 6 discloses the shifter operating mechanism in which the spur gear 64 is keyed to the shaft 165. The spur gear 64, which is also keyed to the shaft 165, engages the worm gear 67 as shown in Figures 2 and 12. The rack member 68 operates on slides in the slot 69 of the member 96 as shown in Figure 12. The rack member is pivotly connected to the L-shaped arm member 70 at the point 71. An arm member 73 is secured to the shaft 75 and the link member 74 pivotly connects the arm member 73 and the L-shaped arm member 70 at the points 76 and 77. The arm member 78 is secured to the upper end of the shaft 61. A link member 79 pivotly connects the arm member 78 and the link member 80 at the points 81 and 82. The link members 80 and 83 are pivotly connected at the fixed point 84. The link 83 is provided with a slot 86 in which the headed pin 85 is adapted to operate. The shifter linkage shown in Figure 6 is located above the top of the milk cans when they are located on the conveyor system. Shifter members 87 and 88 are secured to the shafts 72 and 75, as shown in Figure 1, at level adapted to engage the milk cans when located on the conveyor system. The spring member 89 provides tension between the fixed point 91 and the point 90 of the link 80 while the spring member 92 provides tension between the points 90 and 93. When the arm member 78 turns in a counterclockwise direction, the link member 80 is moved upward as shown in Figure 5. The tension in the spring 92 between the points 90 and 93 causes the left end of the link member 83 to move upward which in turn moves the rack guide 96 and the rack 68 upward so that the rack teeth 97 engage the pinion gear 64, thus causing the rack to move toward the left. By the time the rack 68 has moved most of the distance to the left the arm 78 has turned to a point that the link 79 pulls the link member 80 downward. The tension in the spring 92 then pulls the rack guide 96 and the rack 68 downward. The pinion 64 then disengages the teeth 97 and engages the rack teeth 95. The rack then travels back to the left. When arm member reaches the position shown in Figure 6 the link members 80 and 83 line up as shown and the pinion gear 64 is disengaged from the rack teeth and takes a neutral position as shown in Figure 6.

When the truck driver stops to load milk at a dairy farm the rod 15 is lifted which causes the clutch member 11 to engage the bevel gear 8. Power is transmitted from the V-belt pulley 4 to the V-belt pulley 5 to the V-belt pulley 5 by a V-belt (not shown) which in turn operates the shaft 6. The clutch member 11 which is keyed to the shaft by means of a spline 112 which now engages the bevel gear 8 which now drives the spur gear 16. The spur gear 16 in turn drives the spur gears 17 which are keyed to the shafts 18, which causes the spiral threaded portions 20 to rotate. As the threaded portions 20 rotate the nut members 24, which engage the threaded portions 20, are lowered which also lowers the elevator 21. Thus the milk can 94 is lowered. When the elevator 21 reaches a predetermined point in its downward travel the arm member 25 engages the collar 28 thus pulling the shaft 15 downward. As the shaft 15 moves downward it operates the gear shift member 13 thus disengaging the clutch member 11 and the bevel gear 8 and stopping the downward travel of the elevator 21. While the elevator moves downward the arm 25 also engages the collar 29, at a predetermined point, and pushes the shaft 132 downward. The shaft 132 pushes the trip member 63 down so that the trip member 63 slides under the arm member while the spring 50, shown in Figure 1, provides tension on the clutch operating member 49 which pulls the arm member 53 against the shaft 32.

The truck driver then removes the empty milk can 94 from the elevator 21 while the platform 22 is near ground level position. The truck driver then places the filled milk can on the elevator platform 22 and pulls the shaft 15 downward. When the shaft 15 is pulled downward the gear shift member 13 pushes the clutch member 11 in engagement with the bevel gear 9. Power is then transmitted to the bevel gear 10 which is keyed to the same shaft as the spur gear 16. The spur gear 16 transmits power to the spur gears 17 which turns the shaft 18 and the threaded portions 20 in the opposite direction from the time the elevator was lowered. The threaded portions 20 which engage the nut members 24 causing them to rise and lift the elevator 21. When the elevator 21 reaches a predetermined position in its upward travel the arm member 25 engages the collar 27 and lifts the shaft 15. As the shaft 15 is lifted it operates the gear shift member 13 which causes the clutch member 11 and the bevel gear 9 to be disengaged and stopping the elevator 21 at a position so that the platform 22 is at the floor level of the truck body. During the upward travel of the elevator the arm member 25 engages the collar 26 at a predetermined point which lifts the shaft 132. As the shaft 15 is lifted the lower end of this shaft rises above the level of the arm member 53. The tension of the spring 50 pulling on the clutch operating member 49 causes the clutch members 51 and 52 to engage. Power is then transmitted from the shaft 3 to the shaft 47. A worm gear 46 which is keyed to the shaft 47 and engages the pinion gear 48 as shown in Figure 10. When power is transmitted to the shaft 47 the worm gear 46 turns the pinion gear 48 which turns the shaft 44 and the sprocket wheel 34. The sprocket wheel 34 engages the endless link chain 40 causing it to move. When the link chain 40 moves the pegs 41 engage the milk cans on the conveyor thus moving all the cans on the conveyor system. When the endless link chain 40 moves the sprocket wheels 32 to 38 turn. The sprocket wheel 38 is secured to the shaft 54 which is journaled in the bearings 55 as shown in Figure 11. A sprocket wheel 57 is also secured to the shaft 54. The chain link belt 58 engages the sprocket wheels 57 and 59 thus transmitting motion from the shaft 54 to the shaft 61. When the shaft 61 turns or rotates it carries the arm member 62 in a counter clockwise direction. As soon as the arm member has made one revolution the trip member 63 engages the arm member 53 which is secured to the clutch operating member 49. The trip member 63 moves the arm member 53 and the clutch operating member until the clutch members 51 and 52 are disengaged which stops the conveyor link chain 40.

When the shaft 61 turns it also turns the arm member 78 which operates the linkage 79, 80, and 83 which causes the teeth 94 of the rack 68 to engage the pinion gear 64. The pinion 64 is keyed to the same shaft 65 as the pinion gear 66 which engages the worm gear 67. The rack slides in the slot 67 of the rack guide 96. When the rack 68 moves it moves the arm 70 to which the rack 68 is pivotly connected at 71. The link 74 pivotly connects the L-shaped arm 70 and the arm member 73. As the teeth 97 engage the pinion 64 the rack 68 moves toward the left as shown in Figure 6. This motion causes the shafts 72 and 75 to turn in a clockwise direction. The shifter arms 87 and 88, which are keyed to the shafts 72 and 75 respectively, also turn clockwise. The shifter arm 88 then pushes the filled milk can onto the conveyor. After the arm 78 has made a part of a revolution the arm 78 pulls the linkage 79, 80, and 83 back which causes the rack guide 96 to shift the rack 68 so that the teeth 97 are disengaged from the pinion 64 and the teeth 95 then engage the pinion gear 64. The rack 68 now moves toward the right. This in turn reverses the direction of the shifter arms 87 and 88. The empty milk can 197 has by this time reached a position on the conveyor substantially as shown by the dotted circle 198 in Figure 1. The shifter arm 87 which is at the inside of the empty milk can turns counter clockwise and pushes the empty milk can onto the elevator platform to the position shown by the milk can 94. When the shifters reach this position the arm 78 has rotated to a point at which the arm 78 causes the linkage 79, 80, and 81 to shift the rack guide 96 so that the teeth 96 disengage the pinion 64 and the pinion is again in neutral position as shown in Figure 6. This completes one cycle of operation of my novel unloading, storing and loading device. In case the driver has to load more than one milk can at a stop he repeats the above described operation for each can. By the time the filled can is on the conveyor the truck driver has had time to get back to the cab and is ready to drive to his next stop.

When the truck is unloaded at the dairy or condensery the filled cans are unloaded from the door 98 in the side of the truck body. The clutch 56 is then disengaged which renders the elevating and can shifting system inoperative. The trip member 63 is then pushed down below the arm 53. The tension in the spring 50 then causes the clutch members 51 and 52 to engage which brings the conveyor system into operation. The filled milk cans are then removed from the conveyor through the door 98. As the conveyor system continues to operate all of the filled milk cans will automatically be delivered to the door 98 where they are lifted from the conveyor to a platform on the same level. When the empty milk cans are loaded on the truck they are picked up from the loading platform on dock and placed on the conveyor system through the door 98. The cans are placed between the pegs 41 and are carried around the conveyor system by the pegs 41. In loading the empty cans are placed in proper sequence so that when the driver picks up the next load the empty cans will unload in the proper sequence.

From the above description it will be apparent that my improved device eliminates the lifting of the filled milk cans, the rearranging of cans when loading, the carrying of cans to the door when unloading, and the climbing in and out of the truck body while loading. Also the time required for loading and unloading is much less than the time required to load and unload the present type of milk truck.

Figure 13:
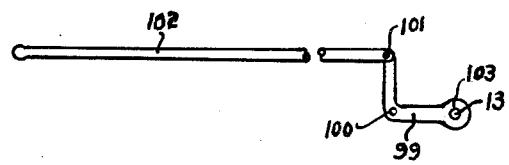
Figure 13 is an elevation view of a control system for the elevator rod operator.

Figure 13 shows an arrangement whereby the driver can operate a lever from the cab so as soon as he stops his truck he can start the elevator mechanism so by the time he reaches the back end of the truck the elevator has lowered the empty milk can and it is ready to be removed. In this arrangement the L-shaped arm member 99 is pivoted on a pin member 100. The one end of the L-shaped arm member 99 is provided with eyelet 103 which engages the clutch shift member 13 while the other end pivotly engages the rod 102 at the point 101. The rod 101 extends from the rear of the truck body where the clutch shift member 13 is located on the truck cab so that the clutch shifter can be operated from the cab.

Figure 14:
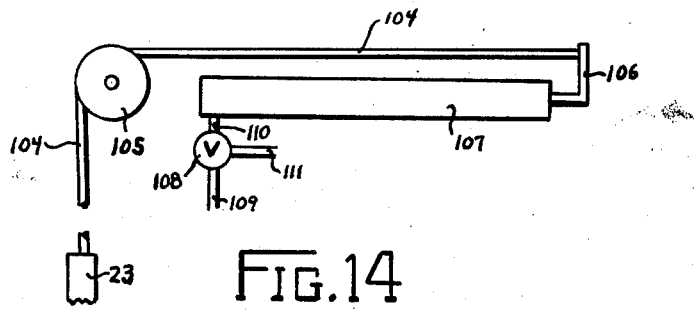
Figure 14 is a view of another elevator operating system.

Figure 14 discloses a variation in the elevating system used in my novel loading, storing and unloading system. In this arrangement the elevator hangers are connected to a cable 104 which operates over the pulley 105 and is secured to the arm member 106. The line 109 is connected to a hydraulic pressure source not shown. The valve 108 is adapted to be operated by the control shaft 15 shown in Figure 5. When the valve allows the hydraulic fluid under presesure to flow from the line 109 through the line 110 into the hydraulic cylinder 107 the pressure forces the piston in the hydraulic cylinder 107 to the right. This moves the arm member 106 to the right which pulls the cable 104 to the right and lifts the elevator hangers 25. When the elevator is to be lowered the control shaft 15 operates the valve 108 so that the pressure line 109 is closed and the relief line 111 is opened. The hydraulic fluid now leaves the hydraulic cylinder 107 through the lines 110 and 111 and the piston in the hydraulic cylinder 107 moves to the left. The arm member 106 then moves to the left allowing the elevator to lower.

Figure 15:
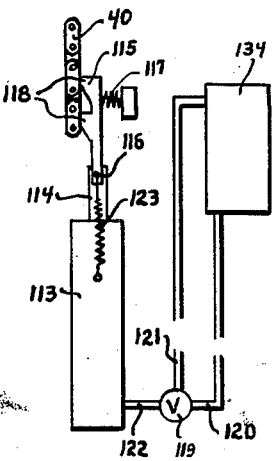
Figure 15 is a plan view showing another method of driving the conveyor link chain.

Figure 15 discloses a hydraulic controlled system for operating the conveyor system. The hydraulic cylinder 113 is provided with a push rod 114 which is secured to the piston in the hydraulic cylinder 113. A ratchet member 115 is pivotly connected to the push rod 114 at point 116. A compression spring 117 holds the teeth 118 in engagement with the endless link chain 40. A two way valve 119 is connected to the hydraulic cylinder 113 by means of the line 122. The line 120 is connected to a source of hydraulic pressure supply and the line 121 is a relief or return line for the hydraulic fluid. The valve 119 is operated by a linkage (not shown) connected to the arm member 62. When the valve 119 allows fluid under pressure from the line 120 to enter the hydraulic cylinder the pressure on the piston causes the push rod 116 to move outward. The teeth 118 engaging the link chain 40 move the chain a predetermined distance. The valve 119 is then operated to close the pressure inlet line 120 and the relief line 121 is opened. The tension spring 123 then pulls the push rod 114 and the ratchet 115 back to the inward position. The system is then ready for the next cycle of operation.

Figure 16:
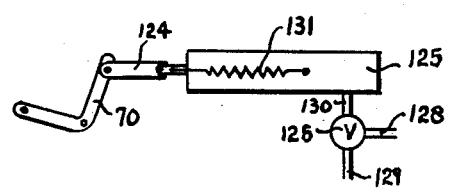
Figure 16 is a plan view of another method of operating the can shifters.

Figure 16 discloses another system of operating the shifter arms 87 and 88. In this connection the L-shaped arm member is pivotly connected to the push rod 124 of the hydraulic cylinder 125. A two way valve 126 is connected to the hydraulic cylinder 125 and is operated by a suitable linkage (not shown) connected to the arm member 78. When the valve allows fluid under pressure to enter the hydraulic cylinder 125 the push rod 124 moves out and operates the shifter members 87 and 88 in one direction. When the valve 126 closes the pressure inlet 128 and opens the relief outlet 128 the spring 125 pulls the push rod 124 back and turns the shifter members in the opposite direction.

From the above description of several embodiments of my invention it will be apparent that many modifications of my novel device can be made without departing from the scope of my invention. For example several of the sprocket wheels shown in Figure 1 can be simultaneously connected to the source of supply to drive the endless link chain 40. Several hydraulic cylinders such as shown in Figure 15 can also be utilized to drive the endless link chain 40. The number of sprocket wheels used and the number of lanes in the conveyor system can be varied according to the space available and the size of the article being conveyed. The angle 43 shown in Figure 3 can be replaced by T members or they can be replaced by pipe members at the bottom on which the cans slide and side or guard rail members to guide the cans. The milk cans can also be placed on dollies or platforms with casters that roll on the base of the conveyor system or the base of the conveyor system can be provided with conventional rollers.

It is also apparent that my improved device can be adapted to trucks hauling keg beer, cartons, boxes, shells or military supplies. My improved device is also adapted to be used in warehouses and storage places.

Figure 17:
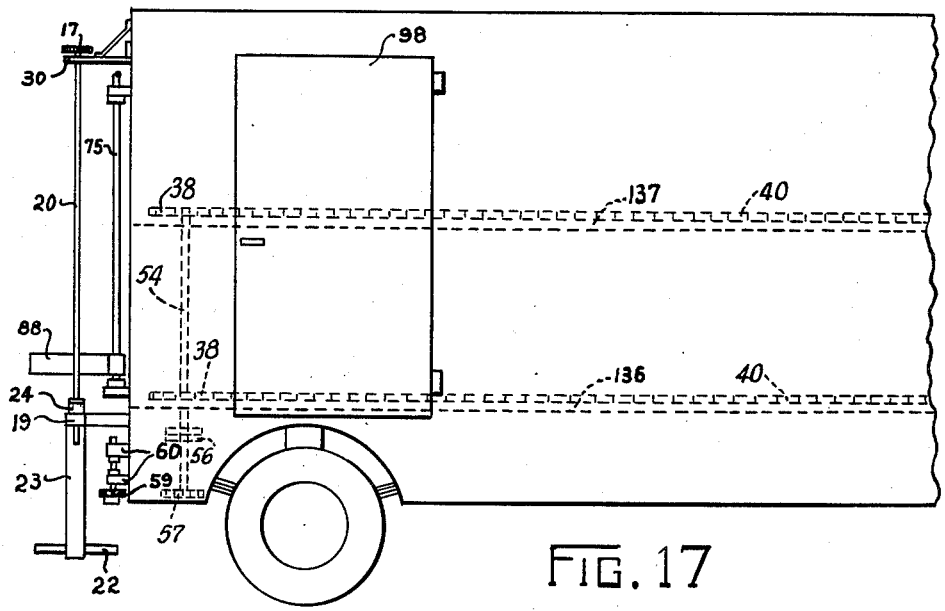
Fig. 17 is a side elevation of a portion of a truck indicating multi-level conveyors.
Figure 18:
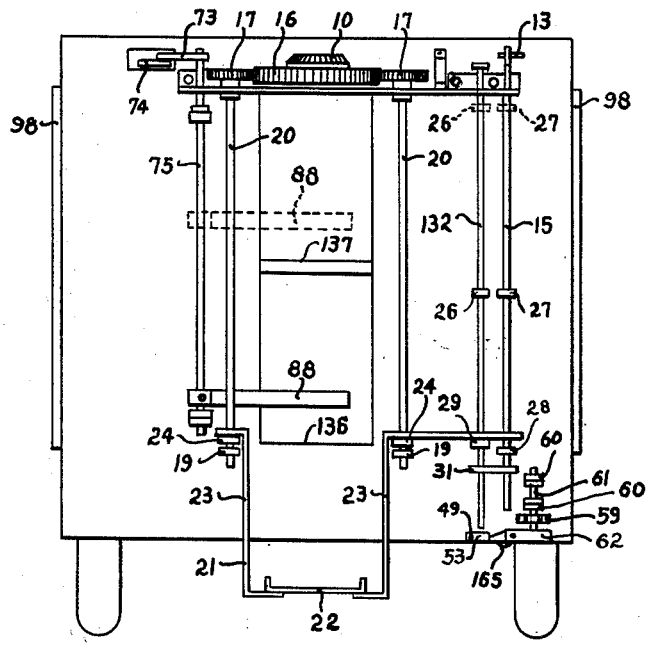
Fig. 18 is a rear end elevation of the truck shown in Fig. 17 showing the elevator in more detail.

My improved loading, storing and unloading device can also be used for trucks and storage spaces provided with two or more decks or floors. By changing the position of the collars 27 and 26 the elevator can be made to operate to different levels in which case a separate conveyor system must be provided for each floor or deck. Two horizontal conveyor systems at different levels 136 and 137 are shown in Figures 17 and 18. Each of these conveyor systems comprises a conveyor mechanism as disclosed in Figure 1. The collars 26 and 27 shown solid in Figure 18 indicate the position of these collars to operate the elevator 21 for loading and unloading from the lower conveyor system level 136. When it is desired to load and unload from the upper conveyor system level 137 the collars are moved to the position indicated by the dotted collars 26 and 27. The dotted shifter arm 88 shows the position of the shifter arm when the upper conveyor level 137 is being used.

While I have described several embodiments of my invention, I do not wish to be limited to the particular forms shown and described as it will be apparent, from the above description, that many modifications therein can be made without departure from the scope of my invention as set forth in the appended claims.

Having thus described my invention, what I claim is:

1. In a loading conveying and unloading system of the type described comprising; a power supply source; horizontal conveyor system, said conveyor system comprising a plurality of base members, a plurality of guide members, an endless chain member engaging a plurality of sprocket wheels, a plurality of chain supporting members, a plurality of upstanding members secured to said endless chain member, and a means including a clutch member for transmitting power from said power supply source to said endless chain member; an elevating system comprising, an elevator platform with a plurality of hanger members fastened thereto, a pair of internally threaded members secured to said hanger members, a pair of vertical shaft members provided with externally threaded portions engaging said internally threaded members, and a gear shaft and clutch mechanism connected to said power supply source adapted to drive, reverse and stop said pair of vertical shaft members; a pair of shifter arm members secured to a pair of vertical shaft members, a linkage engaging shaft members, and a means operated by said power supply source adapted to operate said linkage at predetermined intervals whereby said pair of shifter arm members are turned in one direction to shift articles being unloaded from said conveyor system to said elevator platform and turned in the opposite direction to shift articles being loaded from said elevator platform to said conveyor system.

2. In a loading, conveying and unloading system of the type described comprising; a power supply source; conveyor system, said conveyor system comprising a plurality of base members, a plurality of guide members an endless chain member engaging a plurality of sprocket wheels, a plurality of chain supporting members, a plurality of upstanding members secured to said endless chain member, and a means including a clutch member for transmitting power from said power supply source to said endless chain member; an elevating system comprising, an elevator platform with a plurality of hanger members fastened thereto, a pair of internally threaded members secured to said hanger members, a pair of vertical shaft members provided with externally threaded portions engaging said internally threaded members, and a gear shift and clutch mechanism connected to said power supply source adapted to drive, reverse and stop said pair of vertical shaft members; a pair of shifter arm members secured to a pair of vertical shaft members, a linkage engaging shaft member, a means operated by said power supply source adapted to operate said linkage whereby said pair of shifter arm members are turned in one direction to shift articles being unloaded from said conveyor system to said elevator platform and turned in the opposite direction to shift articles being loaded from said elevator platform to said conveyor system, and a clutch member adapted to render said pair of shifter members inoperative.

3. A loading, conveying and unloading system of the type described comprising a source of power supply, a conveyor system, an elevating system, a shifter mechanism, a conveyor driving system for operating said conveyor system from said source of power supply, a clutch in said conveyor driving system, an elevator driving system adapted to transmit power from said source of power supply to said elevating system, a reversible clutch in said elevator driving system adapted to drive, stop and reverse the elevator of said elevating system, a shifter operating mechanism adapted to transmit oscillatory motion to the shifter arms of said shifter mechanism at predetermined intervals, a reversible clutch shifter member, a hand operable mechanism adapted to operate said clutch shifter member and engage said reversible clutch whereby the elevator of said elevating system is lowered from the level of said conveyor system, an arm member secured to said elevator adapted to engage a reversible clutch operating member and thereby stop said elevator at a predetermined position on its downward travel, a hand operable member adapted to operate said reversible clutch shifter member and engage said reversible clutch whereby said elevator is lifted, said arm member adapted to engage a second reversible clutch operating member whereby said elevator is automatically stopped at the level of said conveyor system; said arm member also engaging a shifter control member whereby said shifter operating mechanism is set into motion and said shifter arms thereby shift the article lifted on the elevator, onto the conveyor system, said shifted control member releasing a clutch operating member of said clutch of said conveyor system whereby said clutch of said conveyor system is engaged by spring tension thereby moving the articles on said conveyor system, when said articles on said conveyor system have advanced a predetermined distance said shifter operating mechanism reverses the motion of said shifter arms whereby an item is shifted from the conveyor system onto said elevator, and a means adapted to stop the conveyor mechanism when said aritcles on said conveyor system have advanced a predetermined distance, said means also rendering said shifter operating mechanism inoperable as soon as said article is shifted onto said elevator thereby rendering the elevator ready to be lowered for unloading.

4. A loading, conveying and unloading system of the type described comprising a source of power supply, a conveyor system, an elevating system, a shifter mechanism, a conveyor driving system for operating said conveyor system from said source of power supply, a clutch in said conveyor driving system, an elevator driving system adapted to transmit power from said source of power supply to said elevating system, a reversible clutch in said elevator driving system adapted to drive, stop and reverse the elevator of said elevating system, a shifter operating mechanism adapted to transmit oscillatory motion to the shifter arms of said shifter mechanism at predetermined intervals, a reversible clutch shifter member, a hand operable mechanism adapted to operate said clutch shifter member and engage said reversible clutch whereby the elevator of said elevating system is lowered from the level of said conveyor system, an arm member secured to said elevator adapted to engage a reversible clutch operating member and thereby stop said elevator at a predetermined position on its downward travel, a hand operable member adapted to operate said reversible clutch shifter member and engage said reversible clutch whereby said elevator is lifted, said arm member adapted to engage a second reversible clutch operating member whereby said elevator is automatically stopped at the level of said conveyor system; said arm member also engaging a shifter control member whereby said shifter operating mechanism is set into motion and said shifter arms thereby shift the article lifted on the elevator, onto the conveyor system, said shifter control member releasing a clutch operating member of said clutch of said conveyor system whereby said clutch of said conveyor system is engaged by spring tension thereby moving the articles on said conveyor system, when said articles on said conveyor system have advanced a predetermined distance said shifter operating mechanism reverses the motion of said shifter arms whereby an item is shifted from the conveyor system onto said elevator, and a means adapted to stop the conveyor mechanism when said articles on said conveyor system have advanced a predetermined distance, said means also rendering said shifter operating mechanism inoperable as soon as said article is shifted onto said elevator thereby rendering the elevator ready to be lowered for unloading, and a manually controlled clutch adapted to render said elevating system and said shifter mechanism inoperative while said conveyor system is operative.

5. A loading, conveying and unloading system of the type described comprising a source of power supply, a conveyor system, a hydraulic conveyor operating system adapted to operate said conveyor system at intermittent intervals, an elevating system, an elevator in said elevating system, a hydraulic device adapted to operate said elevator, a manually controlled means for starting said elevator and a stopping means adapted to automatically stop said elevator at predetermined levels, a shifter mechanism adapted to intermittently shift articles from said conveyor system to said elevator and from said elevator to said conveyor system a hydraulic means for operating said shifter mechanism, a control means operated by said elevator adapted to control the operation of said shifter mechanism, and a second control means operated by said elevator adapted to control the intermittent operation of said conveyor system.

6. A loading, conveying and unloading system of the type described comprising a source of power supply, a horizontal conveyor system, a hydraulic conveyor operating system adapted to operate said conveyor system at intermittent intervals, an elevating system, an elevator in said elevating system, a hydraulic device adapted to operate said elevator, a manually controlled means for starting said elevator and a stopping means adapted to automatically stop said elevator at predetermined levels, a shifter mechanism adapted to alternately shift articles from said conveyor system to said elevator and from said elevator to said conveyor system, a hydraulic means for operating said shifter mechanism and a control means operated by said elevator adapted to control the operation of said shifter mechanism, a second control means operated by said elevator adapted to control the intermittent operation of said conveyor system, and a clutch arrangement adapted to render said elevating system and said shifter mechanism inoperative while said conveyor system operates continuously.

7. A loading, conveying and unloading system of the type described comprising a truck provided with a closed type body, a power takeoff, a conveyor system in said body operated from said power takeoff, an elevating system, an elevator in said elevating system, an elevator driving system driven by said power takeoff provided with arm members adapted to alternately shift articles from said elevator to said conveyor system and from said conveyor system to said elevator, a manually controlled elevator operating means adapted to start said elevator, a stopping means operated by said elevator adapted to stop said elevator at predetermined levels, a conveyor control means operated by said elevator adapted to operate said conveying system at predetermined positions of said elevator, and a shifter control means operated by said elevator adapted to operate said shifter system at predetermined times and a means adapted to synchronize the operation of said elevating system and said conveyor system.

8. A loading, conveying and unloading system of the type described comprising a truck provided with a closed type body, a power takeoff, a conveyor system in said body operated from said power takeoff, an elevating system, an elevator in said elevating system, an elevator driving system driven by said power takeoff provided with arm members adapted to intermittently shift articles from said elevator to said conveyor system, a manually controlled elevator operating means adapted to start said elevator, a stopping means operated by said elevator adapted to stop said elevator at predetermined levels, a conveyor control means operated by said elevator adapted to operate said conveying system at predetermined positions of said elevator, a shifter control means operated by said elevator adapted to operate said shifter system at predetermined times with respect to the movement of said conveyor system, a means for rendering said elevating system and said shifter system inoperative while said conveyor system is operating for unloading articles through side doors in said truck body.

9. In a loading conveying and unloading system of the type described, a conveyor system lying in a substantially horizontal plane, a power driven means adapted to engage articles and move said articles on said conveyor system at predetermined intervals, a power driven elevating system adapted to operate between the level of said conveyor system and a predetermined level, a means adapted to automatically stop the elevator of said power driven elevating system at predetermined up and down positions, a power driven shifter mechanism arranged to move articles onto said conveyor system, said power driven shifter mechanism also arranged to move articles from said conveyor system, said power driven shifter mechanism adapted to be automatically operated by said elevating system.

10. A loading conveying and unloading system of the type described comprising a power driven conveyor system adapted to operate intermittently, a power driven elevating system arranged to lift articles to the level of said conveyor system, said power driven elevating system also arranged to lower articles from said level of said conveyor system for unloading said conveyor system, a power driven shaft, a plurality of levers arranged to be moved by said power driven shaft to move containers from said elevating system to said conveyor system and to move containers from said conveyor system to said elevating system and a means adapted to synchronize the operation of said conveyor system, said elevating system and said plurality of levers, said power driven elevating system adapted to control the operation of said plurality of levers.

11. A loading, conveying and unloading system of the type described comprising a conveyor system provided with a power driven means arranged to move articles on said conveyor system at predetermined intervals, a power driven elevating system, a power driven shaft, a plurality of levers arranged to be moved by said shaft to move articles from said elevating system to said conveyor system in an upright position, said plurality of levers also arranged to move articles from said conveyor system to said elevating system in an upright position, said power driven elevating system adapted to automatically control the operation of said plurality of levers and a clutch adapted to render said plurality of levers inoperative.

12. A loading, conveying and unloading system of the type described comprising a source of power supply, a multi-level conveyor system, a power driven elevating system arranged to operate to any of the levels of said multi-level conveyor system and a power driven means arranged to engage articles and move them onto said conveyor system, said power driven means also arranged to move articles from said conveyor system, said power driven means adapted to be automatically controlled by said power driven elevating system.

13. A loading, conveying and unloading system of the type described comprising a source of power supply, a power driven elevating system, an intermittently operating power driven conveyor system adapted to retain articles in an upright position, a power driven shaft, a shifter means arranged to be operated by said power driven shaft to move articles from said elevating system to said conveyor system in an upright position, said shifter means also arranged to move articles from said conveyor system to said elevating system in an upright position, and a plurality of means adapted to control and synchronize the operation of said elevating system, said shifter means and said conveyor system.

References Cited in the file of this patent

UNITED STATES PATENTS

| | | |
|---|---|---|
| 2,034,517 | Keith | Mar. 17, 1936 |
| 2,146,533 | Erickson | Feb. 7, 1939 |
| 2,158,781 | Browne | May 16, 1939 |
| 2,236,100 | Karnopp | Mar. 25, 1941 |
| 2,244,524 | Lima | June 3, 1941 |
| 2,348,112 | Da Costa | May 2, 1944 |
| 2,360,146 | Lima | Oct. 10, 1944 |
| 2,513,355 | Peckinpaugh | July 4, 1950 |
| 2,548,767 | Brest | Apr. 10, 1951 |
| 2,671,861 | Bullard III | Mar. 9, 1954 |

FOREIGN PATENTS

| | | |
|---|---|---|
| 509,860 | France | Aug. 26, 1920 |